(12) United States Patent
Li et al.

(10) Patent No.: US 9,460,122 B2
(45) Date of Patent: *Oct. 4, 2016

(54) LONG-QUERY RETRIEVAL

(71) Applicant: Microsoft Technology Licensing, LLC, Redmond, WA (US)

(72) Inventors: Zhiwei Li, Beijing (CN); Lei Zhang, Beijing (CN); Rui Cai, Beijing (CN); Wei-Ying Ma, Beijing (TW); Heung-Yeung Shum, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 734 days.

This patent is subject to a terminal disclaimer.

(21) Appl. No.: 13/692,922

(22) Filed: Dec. 3, 2012

(65) Prior Publication Data

US 2013/0346416 A1    Dec. 26, 2013

Related U.S. Application Data

(63) Continuation of application No. 12/571,302, filed on Sep. 30, 2009, now Pat. No. 8,326,820.

(51) Int. Cl.
*G06F 17/30* (2006.01)

(52) U.S. Cl.
CPC ..... *G06F 17/3028* (2013.01); *G06F 17/30448* (2013.01)

(58) Field of Classification Search
CPC ................................................. G06F 17/3028
USPC ............... 707/708, 711, 724, 728, 748, 753, 707/999.005
See application file for complete search history.

(56) References Cited

U.S. PATENT DOCUMENTS

| | | |
|---|---|---|
| 5,280,612 A | 1/1994 | Lorie et al. |
| 5,675,819 A | 10/1997 | Schuetze |
| 5,963,940 A | 10/1999 | Liddy et al. |
| 6,493,709 B1 | 12/2002 | Aiken |
| 6,560,597 B1 | 5/2003 | Dhillon et al. |

(Continued)

OTHER PUBLICATIONS

"An introduction to Information Retreival" Christopher D. Manning, Prabhakar Raghavan, Hinrich Schütze (online draft version) avalilabe online and as indexed by archive.org (Sep. 21, 2008).*

(Continued)

*Primary Examiner* — Syling Yen
(74) *Attorney, Agent, or Firm* — Sandy Swain; Micky Minhas; Lee and Hayes, PLLC

(57) ABSTRACT

Described herein is a technology that facilitates efficient large-scale similarity-based retrieval. In several embodiments documents, images, and/or other multimedia files are compactly represented and efficiently indexed to enable robust search using a long-query in a large-scale corpus. As described herein, these techniques include performing decomposition of a file, e.g., an image, a document containing an image, or a document-like representation of an image. The techniques use dimension reduction to obtain three parts, low-dimensional representations (major semantics), file specific terms (minor semantics), and background words, representing the major semantics in a feature vector and the minor semantics as keywords. Using the techniques described, file vectors are matched in a topic model and the results ranked based on the keywords.

20 Claims, 11 Drawing Sheets

(56) References Cited

U.S. PATENT DOCUMENTS

| | | | |
|---|---|---|---|
| 6,826,557 | B1 | 11/2004 | Carter et al. |
| 7,096,208 | B2 | 8/2006 | Zaragoza et al. |
| 7,383,258 | B2 | 6/2008 | Harik et al. |
| 7,752,195 | B1 | 7/2010 | Hohwald et al. |
| 7,983,902 | B2 | 7/2011 | Wu et al. |
| 2003/0014405 | A1 | 1/2003 | Shapiro et al. |
| 2003/0055813 | A1 | 3/2003 | Chaudhuri et al. |
| 2007/0198363 | A1 | 8/2007 | Quoc et al. |
| 2007/0230791 | A1 | 10/2007 | Chellapilla et al. |
| 2008/0154860 | A1 | 6/2008 | Chen et al. |
| 2011/0078159 | A1 | 3/2011 | Li et al. |

OTHER PUBLICATIONS

"Automatic Image Annotation and Retrieval using Cross-Media Relevance Models" J. Jeon, V. Lavrenko, R. Manmatha (2003).*

"Associative Document Retrieval by Query Subtopic Analysis and its Application to Invalidity Patent Search" Toru Takaki, Atsushi Fujii, Tetsuya Ishikawa (2004).*

Cai et al., "Scalable Music Recommendation by Search",retirved at <<http://research.microsoft.com/en-us/um/people/leizhang/Paper/ACMMM07-Cai.pdf>>, Microsoft Research, Asia, pp. 1065-pp. 1074.

Kumar, "Word Hashing for Efficient Search in Document Image Collections", Interation Institute of Information Technology, Hyderabad, India, Jun. 2008, pp. 1-pp. 112.

Marlins, "Inter-Document Similarity in Web Searches", Department de Informatica Faculdade de Ciencias da Universidade de Lisboa, Campo Grande, Portugal, Oct. 2004, pp. 1-pp. 162.

Office Action for U.S. Appl. No. 12/571,302, mailed on Oct. 18, 2011, Zhiwei Li, "Long-Query Retrieval", 12 pgs.

* cited by examiner

LONG-QUERY RETRIEVAL

RELATED APPLICATIONS

This application is a continuation of, and claims priority to, commonly assigned co-pending U.S. patent application Ser. No. 12/571,302, published as US Patent Application No. 2011/0078159, and entitled "Long-Query Retrieval," which was filed on Sep. 30, 2009. The entire disclosure of which is incorporated by reference herein.

BACKGROUND

Search engines employ a variety of techniques to perform search queries. Although search capabilities have become increasingly important and some natural language based search techniques have been developed, search has essentially remained constrained by small query limits.

Currently, a fundamental technique to find similar documents according to a given query, e.g. document, is to select a minimal representation of keywords or phrases, e.g. 2-10, and use the minimal representation as query input. By using such a minimal representation, related entries are found for each query term, often in an inverted list. Inverted list is a popular data structure to build an efficient index for large-scale text corpora. In an inverted list, words are primary keys, and documents containing the same word are organized as a row of the list. By using an inverted list the search engine achieves efficient response times for queries made up of a few terms.

However, existing query indexing techniques do not address the long-query problem due to the special properties of such a query, e.g. hundreds of terms, sparseness and high-dimensionality. Although short query retrieval techniques have been developed, e.g. 2-10 query terms. A long-query, e.g. 100, 1500, 2000 etc. query terms, presents a different problem from that of a short query.

SUMMARY

A technology that facilitates efficient large-scale similarity-based retrieval is described herein. Techniques are described that facilitate compact representations of files such as documents, images, and other multimedia files and efficient indexing of such files to enable robust search in a large-scale corpus. As described herein, these techniques include performing decomposition of a document or document-like representation using dimension reduction to obtain three parts, major semantics (topic-related words), minor semantics (file-specific words), and corpus level terms (background words). The techniques further include representing the major semantics in a feature vector and the minor semantics as keywords, performing topic learning to obtain a topic model, and performing matching between file vectors and re-ranking based on the keywords.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

The detailed description is set forth with reference to the accompanying figures. In the figures, the left-most digit of a reference number identifies the figure in which the reference number first appears. The use of the same reference numbers in different figures indicates similar or identical items. A reference number having a parenthetical suffix (as in "104(1)" or "112(*a*)") identifies a species of the feature represented by the general reference number (e.g., "104" or "112"); further, use of the general reference number without a parenthetical suffix (as in "104" or "112") identifies the genus or any one or more of the species.

DETAILED DESCRIPTION

Overview

This disclosure is directed to a framework and techniques for compactly representing and efficiently indexing files, e.g., documents, images, and/or other multimedia files, to enable robust search using a long-query in a large-scale corpus. The described operations facilitate efficient large-scale similarity-based retrieval.

The described techniques, systems, and tools facilitate large-scale similarity-based retrieval by efficiently indexing files, e.g., documents, images, and/or other multimedia files based on decomposition using dimension reduction to obtain three parts. The described techniques include representing one part in a feature vector and a second part via keywords while discarding the remaining—third—part, and performing matching between feature vectors then re-ranking the results based on the keywords. A system in which these and other techniques may be enabled is set forth first below. The system described below constitutes but one example and is not intended to limit application of the techniques to any one particular operating environment. Other environments may be used without departing from the spirit and scope of the claimed subject matter. Additional sections describe various inventive techniques, exemplary implementations, and illustrative embodiments. These sections describe exemplary ways in which the inventive tools enable providing an accurate real-time similarity-based search service such that a long-query is efficiently processed for large-scale similarity-based retrieval. An exemplary environment in which these and other techniques may be enabled is also set forth.

Figure 1:
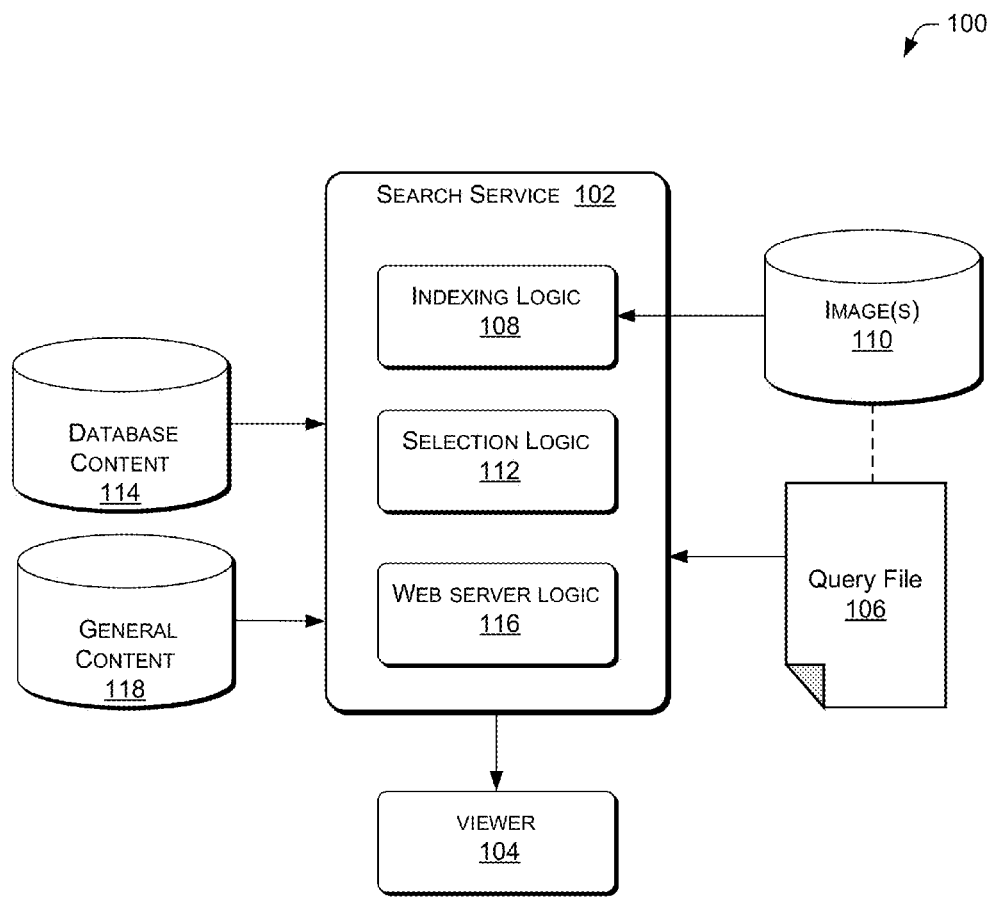
FIG. 1 is a system diagram showing illustrative logical relationships for implementing long-query retrieval.

FIG. 1 shows a system 100 that serves search results to a user. The search results are obtained based on a long-query. Such a technique optimizes long-query results by balancing retrieval speed and accuracy.

System 100 includes a search service 102 that provides search results to a user through a viewer 104. Search service 102 might be a network-based service such as an Internet site, also referred to as a website. A website such as this potentially comprises a number of components such as one or more physical and logical servers. In addition, the website and its servers might have access to other resources of the Internet and World-Wide-Web, such as various content and databases.

Viewer 104 might be an Internet browser that operates on a personal computer or other device having access to a network such as the Internet. Various browsers are available, such as Microsoft Corporation's Internet Explorer. Internet or web content might also be viewed using other viewer technologies such as viewers used in various types of mobile devices, or using viewer components in different types of application programs and software-implemented devices.

In the described embodiment the various devices, servers, and resources operate in a networked environment in which they can communicate with each other. For example, the different components are connected for intercommunication using the Internet. However, various other private and public networks might be utilized for data communications between entities of system 100.

Search service 102 has web server logic 116 that responds to requests from viewer 104 by providing appropriate content. Microsoft's IIS (Internet Information Services) is an example of widely used software that might be used in this example to implement web server logic 116.

In response to requests, web server logic 116 retrieves and provides various types of content, including general content 118, query file 106, and search results 114. Depending on the nature of the service implemented by search service 102, the content might comprise various different media types, including text, graphics, pictures, video, audio, etc. The exact nature of the content is of course determined by the objectives of the service.

In this context, query file 106 might comprise a document, an image, and/or a multimedia file, in some instances supplied by a user of search service 102. General content 118 might comprise other available documents, images, multimedia files and other types of content that are provided to viewer 104. For example, a search service might have various other features in addition to searching, such as discussion, chat, and news features.

The search results themselves are often retrieved from one or more third-party sources. FIG. 1 shows database content 114 as an example of such sources. When serving content to viewer 104, search service 102 retrieves one or more records from database content 114 and serves those to fulfill the user request.

With short queries, it is relatively easy to determine relevant results based on an intersection of the minimal query terms. With long-queries, e.g., document queries, image queries, etc. however, it is much more difficult to determine relevant results because an intersection of so many query terms is likely to yield an empty set.

In some situations, images are represented by a "bag of visual terms" (BOV), which allows text indexing techniques to be applied in large-scale image retrieval systems. However, an image query using BOV approximates a long-query due to the large number of terms, e.g. 100, 1000, 1500 visual terms. Thus techniques for typical text queries (e.g. 2-10 terms) are inapplicable and using some text indexing techniques, e.g. inverted list, returns results that are misleading because the most distinguishing terms may be disregarded.

System 100 has indexing logic 108 that decomposes a file, e.g., a document or a document-like representation of an image or other multimedia file into multiple components, one for dimension reduction and another for residual information preservation. In some instances a third component for background information is created and discarded. In other instances, the third component is not created; rather the information not belonging to the first two components is discarded. Computing similarity of a file may be applied to measuring similarities of the first two components of the file. This decomposition has two primary benefits: 1) these components have properties that enable them to be efficiently indexed and retrieved; 2) The decomposition has better generalization ability than other dimension reduction algorithms. In other words, the decomposition technique is useful in many types of search and indexing applications.

Long-query retrieval may be categorized as a high-dimensional indexing problem in which a file, e.g., a document, or a document-like representation of an image or other multimedia file, is represented as a feature vector in a high-dimensional vector space. Each entry of a file vector corresponds to a word which is may be weighted by term frequency-inverse document frequency (TF-IDF). The basis of most high-dimensional indexing techniques is to partition a feature space to many bins. Thus, when two samples appear in the same bin, the two samples are regarded as similar. A tree structure, e.g. a kd-tree, is a widely utilized structure to partition feature spaces. However, both the many bins and the kd-tree approaches degenerate to essentially a linear scan with more than about 30 dimensional spaces because to find a nearest neighbor in a high-dimensional space, backtracking is often performed.

The computational costs to search files, e.g., documents, images, etc. by a linear scan (e.g. using a TF-IDF weighting scheme and cosine similarity), is unacceptable in terms of both memory and time. Thus, an effective and scalable indexing solution lowering the computational costs of memory and time is presented herein. Compared with a short query, a long-query provides more accurate information about a user's information need. However, to use the information to perform more accurate retrieval, more computations are performed and more index data is loaded in memory.

One data structure to build an efficient index for large-scale text corpus is an inverted list. In inverted list, words are primary keys, and documents containing the same word are organized as one row of the list. Given a word, all documents containing the word can be obtained. For example, for a short query, e.g., "Kung Fu Panda," a search engine can obtain documents containing all three terms by merging three rows of its inverted list. Because in web search, the queries are often short, i.e. 2-10 terms, search engines only need to access a few rows of its inverted list. The low computational cost guarantees a short query can be answered quickly. However, the inverted list data structure cannot solve the long-query retrieval problem because the computational cost to access and merge about 2000 rows of the table is unacceptable. The computational cost being exacerbated when the table is too large to be loaded in memory. Large-scale similarity-based retrieval as described herein balances retrieval speed and accuracy to provide an efficient solution.

Indexing logic 108 represents functionality for decomposing files into major and minor components and in some cases background components. Although the described embodiment discusses long-query retrieval in terms of document queries and image queries, the techniques described herein are also useful to determine search results for web pages, multimedia files, etc.

The query file 106, which indexing logic 108 uses to perform a search, can be a single file or a plurality of files. Furthermore, query file 106 may come from multiple sources. For example, a document written by a user, a web page visited by a user, and/or an image such as a photo taken by a user. Images may also include images from other sources including scanned images, images downloaded or obtained from the internet, images obtained from other users, etc.

In at least one embodiment, query file 106 embodies a file stored on a personal web page and/or photo sharing site such as Flickr™, Shutterfly™, PictureShare™, PictureTrail™, photo-blogs, etc. Alternatively, such a query file might be on a user's local computer and used in conjunction with a locally-executable application program such as Picasa™, MyPhotoIndex, etc. Furthermore, locally stored content might be used in conjunction with web-based applications, or remotely stored content might be used in conjunction with application programs executing on a local computer.

Query file 106 may be stored on a computing device and/or on network storage. In some instances query files are stored in folders or shared in streams with designations that are meaningful to the user. Because users share their files, the shared files are accessible for mining. In addition, users may collect files such as documents and/or images by browsing internet web pages. Collections of these files may be mined even if the user does not explicitly save the files.

Whereas a document query may be performed based on the document itself, in some instances a document-like representation of a file such as an image or multimedia file includes creating the document-like representation of the file. Thus, in some instances, indexing logic 108 may obtain an image 110 before the image 110 has been processed for representation by a "bag of visual terms" (BOV). In such instances, indexing logic 108 may perform processing to determine a BOV model, e.g., a document-like representation of the image, representing image 110 with a fixed-length high-dimensional feature vector, which may contain more than one million features. Although the dimensionality of the new image representation may be very high, most of its feature values will be zero. In other words, the image feature vector will be extremely high-dimensional and it will be sparse.

Whether a long-query is based on a query file 106 made up of a document or a document-like representation of another type of file, e.g., image 110, high-dimensionality and sparseness are characteristics that indexing logic 108 is programmed to address. In addition to the components described so far, system 100 has selection logic 112 that selects content from database content 114 based on the determination of indexing logic 108 of the components of the query file. Generally, this is accomplished by searching for records having topics corresponding to the major components, ranked based on the minor components or other techniques as described more fully below.

Figure 2:
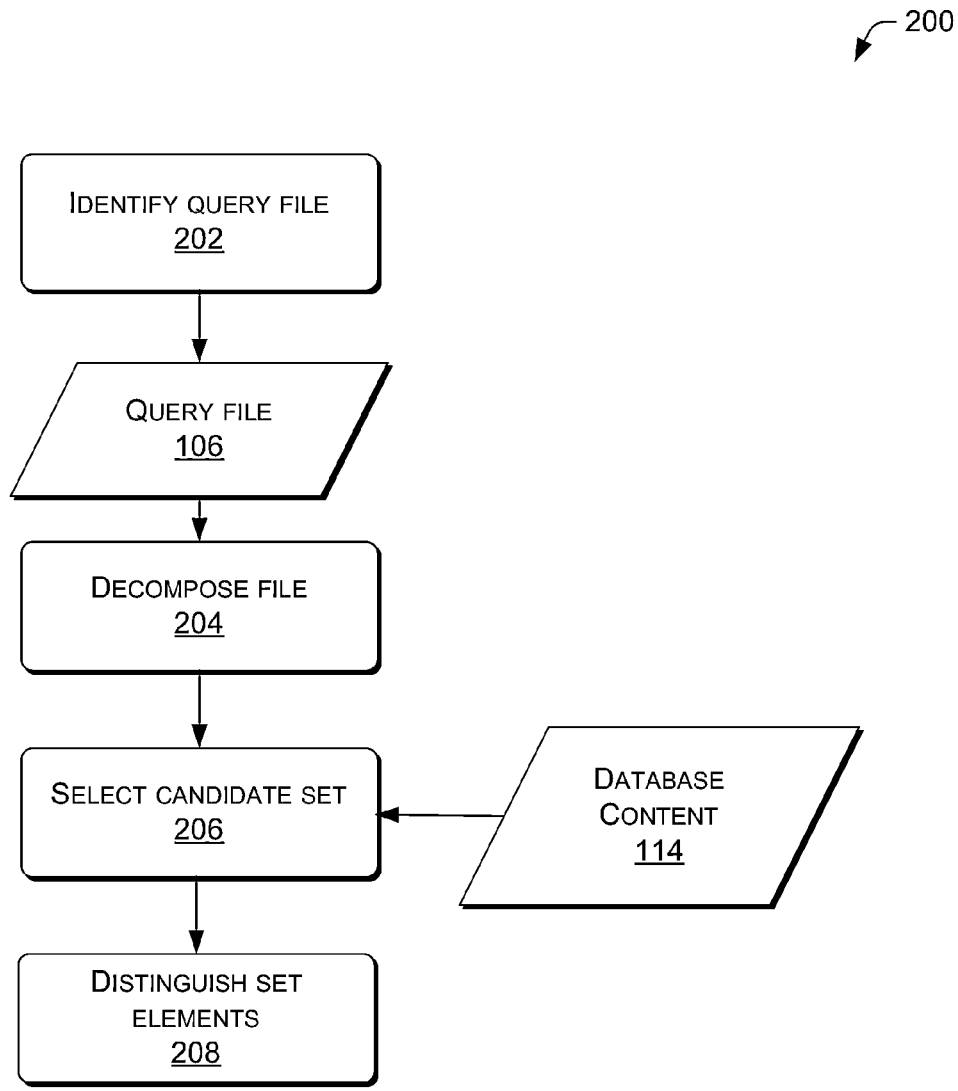
FIG. 2 is a flow diagram showing an illustrative process of providing relevant long-query retrieval.

FIG. 2 shows an illustrative process 200 as performed by system 100 of FIG. 1 for efficiently providing search results based on a query file.

An action 202 comprises identifying a query file. As mentioned above, such a file may include one or more documents, images, multimedia files, etc.

In various implementations search service 102 may be configured to select the query file 106 at various levels of granularity. For example, search service 102 may be configured to select a single document or image as the query file, subsets of documents or images as the query file, and all of the documents or images in a file or associated with a user's account as the query file. Similarly, search service 102 may be configured to select files the user has received from other users as the query file, files the user has sent to other users as the query file, and web pages the user has requested as the as the query file.

In some situations, the query file will be defined simply as the group of files that has been requested for current viewing by the user, on a single web page.

At 204, indexing logic 108 decomposes a file to learn a major semantic, e.g. topic-related words, and minor semantic, e.g., file-specific words by analyzing the file identified at 202. Generally, this is accomplished by implementing a probabilistic topic model combining document contents and a topic model to categorize the document according to a topic corresponding to the major semantic. This will be explained in more detail with reference to FIGS. 4, 5, and 6.

Action 206, performed by selection logic 112, comprises selecting a candidate set corresponding to the topic-related words identified in 204. Action 206 is accomplished by comparing the learned major semantic topic to the topics of available content for search results. This will be explained in more detail with reference to FIG. 7.

Action 208, performed by selection logic 112, comprises distinguishing documents belonging to the same category returned in action 206 using a re-ranking process, such as a two-step approach. This will be explained in more detail with reference to FIG. 7.

Figure 3:
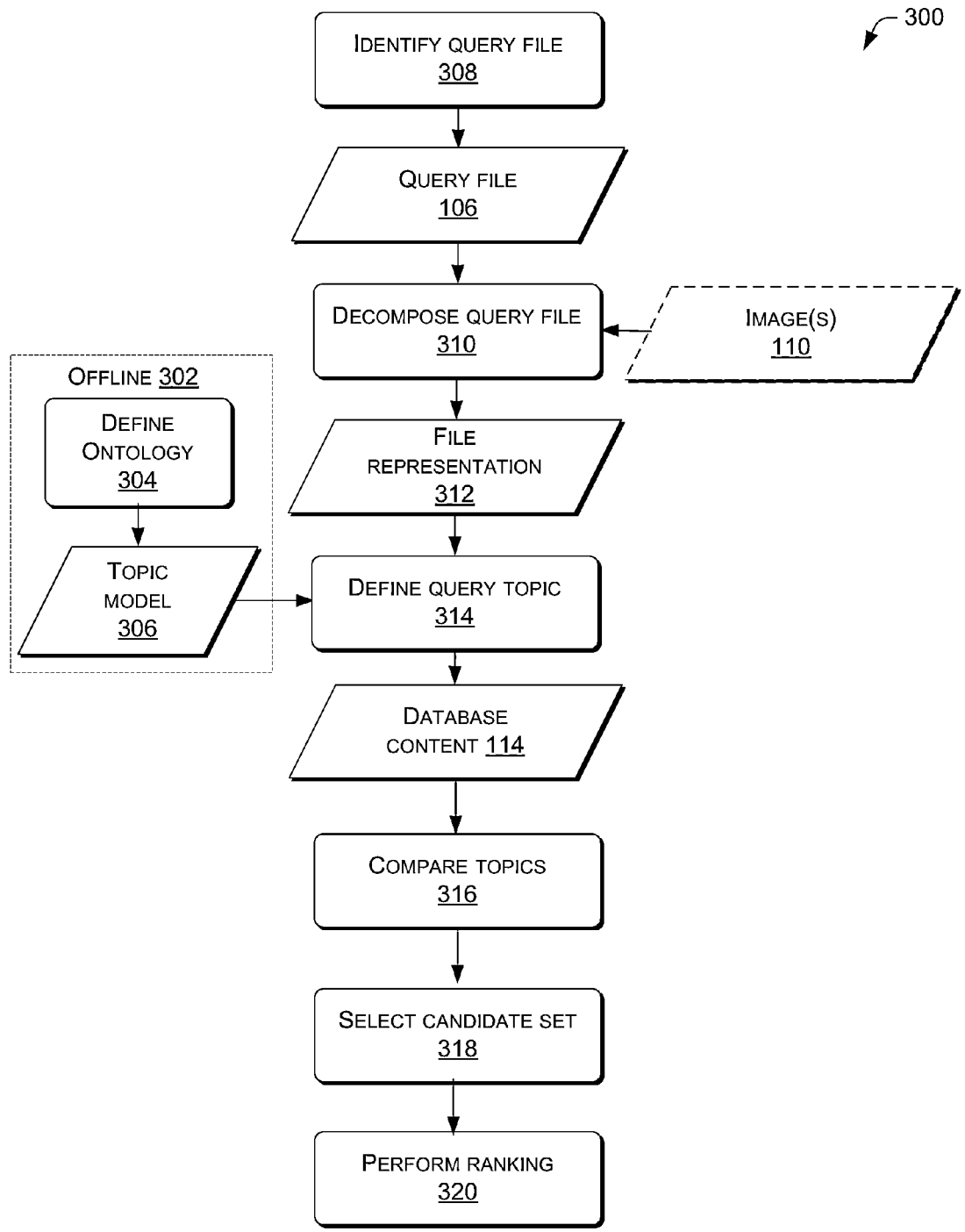
FIG. 3 is a flow diagram showing an illustrative process of providing relevant long-query retrieval.

FIG. 3 shows another example 300 of how search results can be selected based on a long-query.

The process shown in dashed block 302 is an offline process, performed once, prior to the other actions shown in FIG. 3, to prepare reference data which will be used by the run-time process of dynamically selecting search results shown on the portion of FIG. 3 that is outside of block 302.

Action 304 comprises defining an ontology of topics 306. Topic model 306, also called a topic space, is defined with a hierarchical tree structure. The model comprises a hierarchical category tree, which is based on an open directory project (ODP) or concept hierarchy engine (CHE), or other available taxonomies. The hierarchical category tree is made up of category nodes. In the hierarchical structure, category nodes represent groupings of similar topics, which in turn can have corresponding sub-nodes or smaller groups of topics. Action 304 is discussed in more detail with reference to FIG. 4.

Topic model 306 is compiled offline, and used as a resource in other steps of process 300, as further described below. In other embodiments, the topic model 306 can be determined dynamically, in conjunction with learning topics for long-query retrieval.

Actions 308 through 320, shown in the vertical center of FIG. 3, are typically performed in response to a request received at search service 102 for some type of search based on a long-query. In conjunction with the request, search results will be selected and provided to the requesting user or viewer.

An action 308 comprises identifying a query file 106 as already discussed. Action 310 comprises decomposing query file 106. In at least one embodiment files are decomposed using a decomposition model (DM), e.g. document decomposition model (DDM), image decomposition model (IDM), etc. The decomposition model described herein is a flexible and widely applicable approach. The base function is to partition a file to major semantics (topic-related), minor semantics (file-specific), and white noise (background words). The last kind of information is abandoned, and the first two kinds of information facilitate compact representation and efficient indexing. Although such file representations are very compact, they keep almost all of the semantics of the original file. Thus, the DMs described herein obviate problems caused by long-queries. Other approaches that achieve this partition are also envisioned. In various implementations several heuristic approaches were developed and applied. The heuristic approaches were evaluated on various datasets with their performance being only slightly less than DM such as DDM and/or IDM. However, such heuristic approaches may have added benefits such as lowering computation costs (memory and time) and may incorporate human knowledge.

As noted above, in some instances an image 110 may be processed for representation by a "bag of visual terms" (BOV), and that document-like representation of the image may serve as a query file for decomposition. Because the processing to obtain the BOV representation is optional, image(s) 110 is illustrated with a dashed line in FIG. 3. As mentioned above, decomposition of the query file at 310 includes identifying major semantics, (e.g. topic-related words), and minor semantic, (e.g., file-specific words as well as background words. In several embodiments the topic-related words are projected onto a feature vector, the file-specific words, or a predetermined number of the file-specific words are retained, and any remaining or background words are discarded.

Action 310, in at least one embodiment, comprises indexing logic 108 decomposing a file (d) using latent semantic indexing (LSI), such that d, (a W-dimensional sparse vector, where W is the size or the vocabulary), is decomposed to $$d=\mu+Xw+\epsilon$$

where $\mu$ is the mean of features, X is a set of principle components, w is a k-dimensional coefficient vector, k is the number of principle components (k<<W) and $\epsilon$ is residual. By removing the mean vector, the inner product of a file d and a query file q is computed by $$<d,q> \approx <Xw_q+\epsilon_d><Xw_q+\epsilon_q> \approx w_d^T w_q + \epsilon_d^T \epsilon_q$$

Here, a property of singular value decomposition (SVD) is used: the residual ($\epsilon$) being orthogonal to principle component (X). That is, the residual cannot be projected to the space spanned by the principle components. The vector pair $<w, \epsilon>$ is a complete representation of file d. Considering the physical meanings of w and $\epsilon$, an effective approximation of the inner product is obtained. For a good LSI decomposition, entries of $\epsilon$ usually are very close to zero. Thus, even if only a few large entries of the two $\epsilon$ vectors are kept, the inner product of two files only changes slightly. However, in this way, the space needed to store files is greatly reduced. To store a raw file vector, d, |d| storage cells are needed, where |d| is the size of the file. However, to store the new appropriate representation, only k+t storage cells are needed, where t is the number of $\epsilon$ entries kept. k+t is much less than |d| in practice.

An objective function of a dimension reduction algorithm is $$\min \sum_{i=1}^{N} \| p_i - V \times h_i \|$$

where $p_i$ is the high-dimensional histogram representation of a file, e.g., image, multimedia file, document, V is a matrix whose column vectors span a low-dimensional space, and $h_i$ are the coefficients to reconstruct the file by column vectors of V. $h_i$ is the compact representation of the original histogram feature $p_i$ in the low-dimensional subspace V.

However, $h_i$ does not contain the complete semantics of a file. The lost semantics of a file in the dimension reduction process are likely to be very discriminative. Thus, a compound file representation consisting of a low-dimensional vector $h_i$ and some important residual information lost in dimension reduction $\epsilon$ is preferred. For example, an image $p_i$ can be mathematically represented by $$p_i = V \times h_i + \epsilon_i$$

where $\epsilon_i$ is residual of the reconstruction. $\epsilon_i$ has the same dimensionality as $p_i$. However, only components with the largest absolute values in $\epsilon_i$, which are more important than other components in terms of reconstructing distinguishing aspects of the image, need to be preserved. The objective function may similarly be applied to various types of files for dimension reduction.

Probabilistic topic models are another type of dimension reduction approach useful in information retrieval (IR) that may be understood as equivalent to matrix factorization approaches. Although the computations of topic models are more complex than matrix factorization approaches, matrix factorization approaches may present a better way to understand the probabilistic topic model. Additionally, matrix factorization approaches may be generalized to unseen, e.g., query, data. The "topic" of topic models is equivalent to the base vector in matrix factorization approaches. However, compared to matrix factorization approaches, topic models provide better insight to real world queries. Nevertheless, the equivalence of matrix factorizations and topic models enables file decomposition implementation by various approaches and heuristics due to the scalability of the indexing framework.

Decomposition of a file at 310 results in a vector-residual pair representation of the file, shown as file representation 312. File representation 312 provides an effective approximation of query file 106, except that representation 312 requires much less storage space than the raw file. Further, representation 312 provides for an efficient indexing solution.

In turn, at 314 the vector of file representation 312 is used as the basis of a textual search against topic model 306 to define a query topic at 314. Action 316 comprises comparing or mapping the query topic to database content 114. In several embodiments database content comprises vector-residual pair representations of individual records of database content 114, and action 316 comprises comparing one or more of the vector and/or the residuals of the vector-pair representations of the query file and the records of database content 114. Action 318 comprises selecting a candidate set of search results based on the comparison at 316. Action 320 comprises re-ranking, e.g., two-step re-ranking, of the candidate set of search results from 318 based on the residual from the vector-residual pair of the representation 312.

Topic Model

Figure 4:
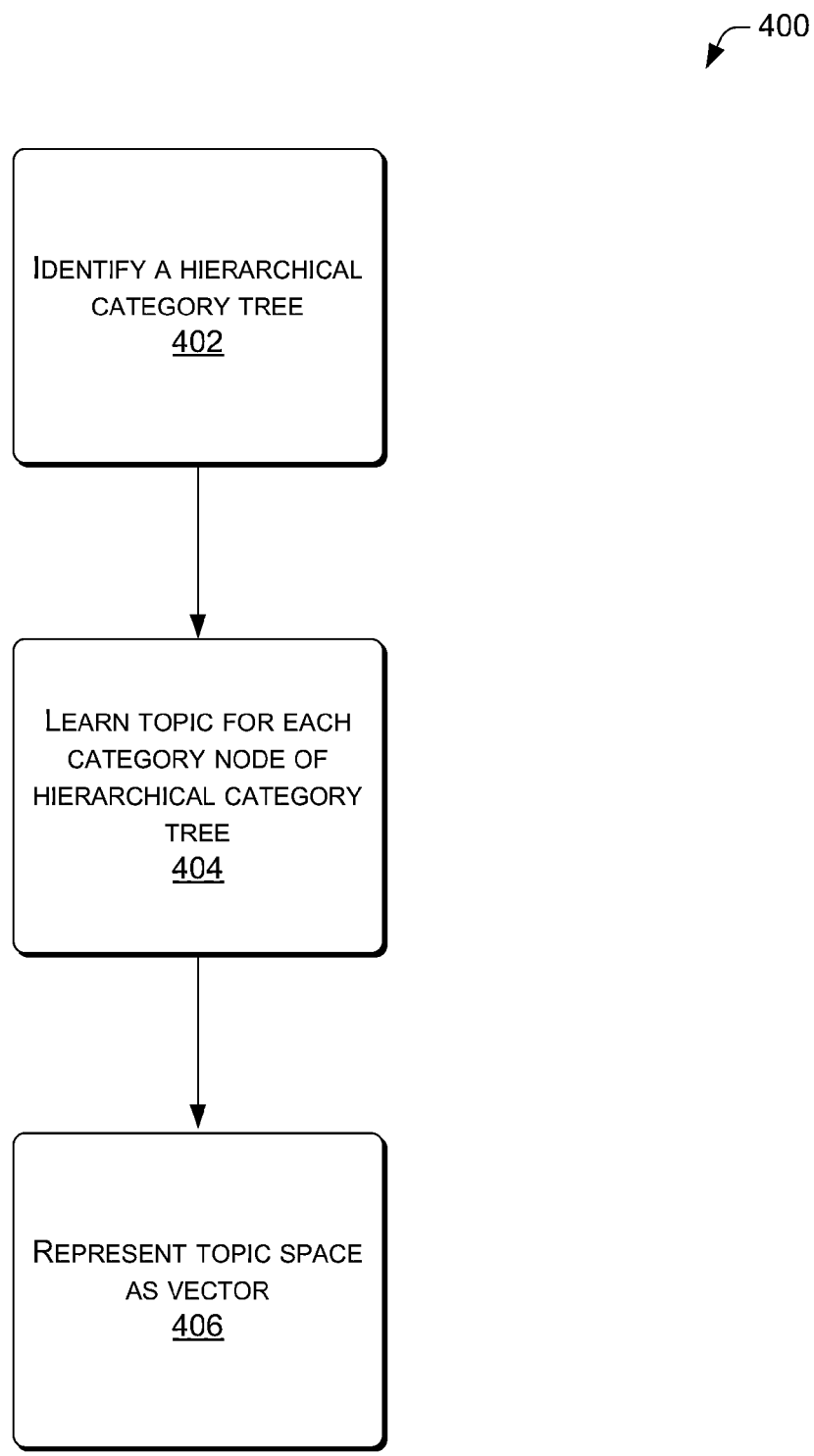
FIG. 4 is a flow diagram showing additional aspects of an illustrative process of implementing long-query retrieval.

FIG. 4 shows an example of how a topic model is created at 400. This corresponds to offline step 304 of FIG. 3, although in alternate embodiments all or part of step 304, such as updating the topic model may be accomplished online. A topic model, also called a topic space, is a hierarchical ontology effective for representing files.

A common concern regarding clustering based algorithms is that the number of topics (e.g., clusters) may affect the algorithms' performance. In various implementations, as the number of topics was increased, the number of topic-related words correspondingly increased and the number of file-specific words decreased. However, as either the number of topic-related words or the number of file-specific words decreased to approach zero, the performance degenerated to approximate TF-IDF. In several implementations, topic numbers ranging from between about 80 to 300, e.g., 100, 150, 200, etc., resulted in effective performance of file decomposition. This may be understood from the view of matrix factorization. For example, for a text corpus, the document-word co-occurrence matrix may be well re-constructed by about 200-300 base vectors.

Topic models assume words of documents are drawn from topic distributions. Under the framework of topic models, a set of topics is constructed ($\Phi1:K$ of DM), and an inference algorithm of DM (DDM and/or IDM, etc.) is run to decompose files, e.g., documents, images, etc. Topics may be obtained by many existing approaches, such as Latent Dirichlet Allocation (LDA) and Probabilistic Latent Semantic Indexing (pLSI). A heuristic but very practicable method is to obtain topic vectors from web pages of ODP by counting word frequencies in documents of each category. An ODP category may be mapped to one or more topics. Topic vectors from a supervised model such as ODP are likely to be more reasonable than those obtained by purely unsupervised models. Additionally, term frequency-inverse document frequency (TF-IDF) may be used to weight terms of a file. The top N words may then be extracted as its file-specific words. Files represented by the decomposition model are very compact. This compactness facilitates indexing and searching a virtually unlimited number of files in the long-query retrieval framework. Furthermore, problems of synonymy and polysemy are alleviated through the use of the long-query retrieval techniques discussed herein.

In this description, at 402 a hierarchical category tree is identified upon which to build the hierarchical topic space. In this example, the hierarchical topic space is built offline using a publicly available ontology provided by the Open Directory Project (ODP), a concept hierarchy engine, or other such hierarchical category tree.

ODP is a manually edited directory. Currently it contains 4.6 million URLs that have been categorized into 787,774 categories by 68,983 human editors. A desirable feature is that for each category node of ODP, there is a large amount of manually chosen web pages that are freely available to be used for either learning a topic or categorizing a file at the query time. Topic model 306 is based on the ODP tree, along with a topic that is learned for each ODP category node based on its associated web pages.

At 404, using the ODP tree, a topic is learned for each category node based on the web pages associated with the node. One way to learn these topics is to represent each web page attached to the corresponding category node by a vector space model, for example weighted by TF-IDF, (which will be discussed below). The weight vectors of all the web pages belonging in the category are then averaged. The resulting feature vector defines a topic.

In the ODP tree, the web pages under the same node were chosen by human experts because they are about the same topic. There are two types of words among the web pages: topic-related words and topic-unrelated words. Topic-related words will cover a small vocabulary with similar terms because they are similar to each other while topic-unrelated ones will have a much larger and more diverse term vocabulary including file-specific words and background words.

In some embodiments, an inverted index based on one or more hierarchical category trees or ontologies is built to make topic matching efficient enough for real-time matching between topics in the topic space and queries.

When a group of files, such as web pages, documents, or photographs are associated with a category node, such as a node in a concept hierarchy engine tree, an open directory project tree, or other such hierarchical category tree, the group of files may be represented in a vector space model. In at least one embodiment the vector space model is weighted using TF-IDF and the weight vectors of all or a plurality of the groups of files belonging to the category are averaged to obtain a feature vector that defines the topic.

At 406, the topic space may be represented in a vector space model in which a feature vector is created from the nodes of the hierarchical category tree. To enable online usage of the topic space, once a topic is represented as a weighted vector, the topic is treated as a file upon which an inverted index is built to index all of the topics, so that given a query term; all topics that contain this term may be instantly fetched.

Decomposing Files

Figure 5:
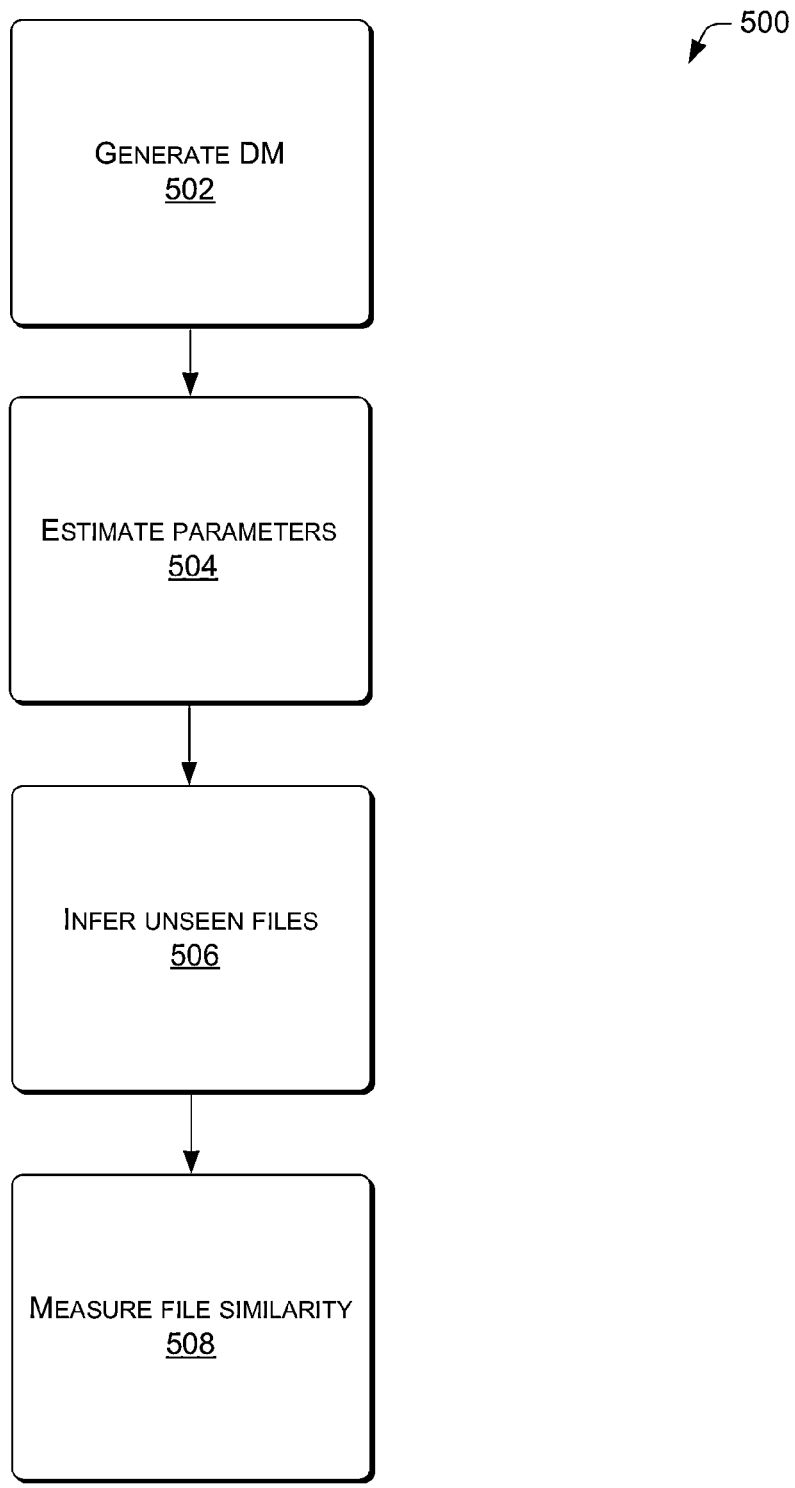
FIG. 5 is a flow diagram showing additional aspects of an illustrative process of implementing long-query retrieval.

FIG. 5 shows how step 310 of FIG. 3 is performed in at least one implementation. Process 500 involves decomposing a file, e.g., documents or document-like representations into major semantics (topic-related words), minor semantics (file-specific words), and white noise (background words). By decomposing the file, dimensionality may be reduced without losing the majority of file semantics. The background words are discarded; however the topic-related words and file-specific words can be compactly represented and efficiently indexed. This transforms the file to a compact file representation 312.

In at least one embodiment, the number of file-specific words may be proportionally tied to the number of topics. In at least one other embodiment, the number of file-specific words may be set independently from the number of topics However, in several implementations the number of file-specific words were controlled to be between about 5 to 40, e.g., 5, 15, 30, etc. when the number of topics was set to 250. This demonstrates maximizing retrieval accuracies while simultaneously minimizing memory and computational costs.

Action 310, in several embodiments, comprises a graphical model implementation of file decomposition. Topic models assume words are drawn from a set of topic distributions—they describe generative processes of documents. At 502, for each file, e.g., document, the generative process of DDM is presented in Table 1, and e.g., image, the generative process of IDM is presented in Table 2, below. An illustration of such probabilistic decomposition models is presented in FIG. 9, below.

TABLE 1

1. Draw $\lambda \sim Dir(\gamma)$
2. Draw $\phi \sim Dir(\beta_2)$
3. Draw $\theta \sim Dir(\alpha)$
4. For each word of the document
  (a) Draw a. $x \sim Mult(\lambda)$
  (b) if $x = 1$, draw $x \sim Mult(\theta)$, and then draw a word $\omega \sim Mult(\phi_x)$
  (c) if $x = 2$, draw a word $\omega \sim Mult(\phi)$
  (d) if $x = 3$, draw a word $\omega \sim Mult(\omega)$

TABLE 2

- if x = 1, draw x ~ Multinomial(θ), and then draw a visual word ω ~ Multinomial($\phi_x$)
- if x = 2, draw a visual word ω ~ Multinomial($\phi$)
- if x = 3, draw a visual word ω ~ Multinomial(ω)

In DM, to generate a word, a random variable x is first drawn from Multinomial (λ). The conditional probability of a word given a file f (e.g., a document, an image, etc.) in DM may be represented by the following equation.

$$p(w|d)=\Sigma_z p(w|z)p(z|x=1,d)p(x=1,d)+p(w|x=2,d)p(x=2,d)+p(w|x=3,d)p(x=3,d)$$

DM uses a switch variable x to control the generation of words in DDM and visual words in IDM. x takes value 1, 2, or 3, which controls whether a word is drawn from either a topic distribution (z and $\Phi_z$), a file-specific distribution (document $\phi$, image $\psi_i$, etc.), or a corpus background distribution (ω). The DM provides a natural way to partition a file into three parts of words. A word which appears in almost all files (or files of like type, such as image, document, etc.) is likely to be a background/stop word; a word which appears in only a few files, but rarely appears in other files is likely to be a file-specific word; a word which appears widely in files with a common semantic, but seldom appears in other files—that do not share that semantic—is likely to be a topic-related word. Notably, file-specific words are likely to have the largest TF-IDF values in a file.

The work of DM can be understood as simultaneously finding a group of basis vectors ($\Phi_z$, a set of distributions over vocabulary), coefficients ($\theta_d$, topic mixture proportion), and residual ($\psi_d$, a file-specific distribution), which correspond to V, $h_i$ and $\epsilon_i$, respectively as discussed regarding 310. The visual terms generated from the background distribution correspond to the mean of file histograms. The compound representation of a file obtained by DM is a pair $\langle \theta_d, \psi_{large} \rangle$, where $\psi_{large}$ means part of $\psi$ components which have the largest values.

$$f = \begin{bmatrix} \cdot & \cdot & \cdot \\ \cdot & \Phi_{ij} & \cdot \\ \cdot & \cdot & \cdot \end{bmatrix} \begin{bmatrix} \cdot \\ \theta_{d\gamma d1} \\ \cdot \end{bmatrix} + \begin{bmatrix} \cdot \\ \varphi_{d\gamma d1} \\ \cdot \end{bmatrix} \gamma d2 + \begin{bmatrix} \cdot \\ \omega \\ \cdot \end{bmatrix} \gamma d3$$

Thus, for a file d, decomposition can be illustrated by the matrix factorization above as another equation discussed regarding 310: $d=\mu+Xw+\epsilon$.

At 504 parameters are estimated. Because the maximum likelihood estimation of DM is intractable, the Monte Carlo Expectation Maximization (MCEM) algorithm is used to estimate parameters as presented in Table 3, below.

TABLE 3

Algorithm 1. Estimating Parameters by Monte Carlo EM

1. Initialize hyper-parameters
2. "burn-in" the Markov chain. Sampling N (e.g. 300) rounds as Equation (2)
3. Repeat until converge
   a) Sampling L (e.g. 50) rounds to get a group of x and z as equation (2)
   b) Update hyper-paramters as equation (4)
4. Compute expectations of model parameters $\phi$ and ω ...

MCEM is a two-step process. In at least one embodiment, during the E step, samples are drawn from the posterior of latent variables using Gibbs sampling. Conditional independencies between variables are leveraged such that only x and z need be sampled. Thus, x and z are jointly sampled while other hidden variables are integrated out. The Gibbs sampling equations are $$p(x_i = 1, z = k \mid x_{-i}, z_{-i}, w, \Theta) = \\ + \frac{\gamma_1 + n_{d,-i}^{1,\cdot}}{\Sigma_{j=1}^3 \gamma_j + n_{d,-i}^{j,\cdot}} \times \frac{\alpha_k + n_{d,-i}^{1,k}}{\Sigma_{j=1}^K \alpha_j + n_{d,-i}^{1,j}} \times \frac{\beta_{1,w_i} + n_{-i,w_i}^{1,k}}{\Sigma_{j=1}^W \beta_{1,j} + n_{-i,j}^{1,k}}$$

$$p(x_i = 2 \mid x_{-i}, z_{-i}, w, \Theta) = \frac{\gamma_2 + n_{d,-i}^{2,\cdot}}{\Sigma_{j=1}^3 \gamma_j + n_{d,-i}^{j,\cdot}} \times \frac{\beta_{2,w_i} + n_{d,-i}^{w_i}}{\Sigma_{j=1}^W \beta_{2,j} + n_{-i}^{w_i}}$$

$$p(x_i = 3 \mid x_{-i}, z_{-i}, w, \Theta) = \frac{\gamma_3 + n_{d,-i}^{3,\cdot}}{\Sigma_{j=1}^3 \gamma_j + n_{d,-i}^{j,\cdot}} \times \frac{\beta_{3,w_i} + n_{\cdot,-i}^{3,w_i}}{\Sigma_{j=1}^W \beta_{3,j} + n_{\cdot,-i}^{j,w_i}}$$

where Θ denotes all hyper parameters, i.e., α, γ, $\beta_{1,2,3}$, −i means all words except the current word $w_i$, $n_{d,-i}^{j,k}$ denotes the number of words assigned to x=j and z=k in file d where file d may be one or more of a document, an image, and/or a multimedia file, and $n_{-i,w_i}^{1,k}$ denotes the number of times of word $w_i$ assigned to z=k. A fixed-point iteration algorithm is used to update hyper-parameters in the M step.

A variant of the above Gibbs sampling equations are $$p(x_i = 1, z_i = k \mid x_{-i}, z_{-i}, w, \alpha, \gamma, \beta_1, \beta_2, \beta_3) = \\ + \frac{\gamma_1 + n_{d,-i}^1}{\Sigma_{j=1}^3 \gamma_j + n_{d,-i}} \times \frac{\alpha_1 + n_{d,-i}^{1,k}}{\Sigma_{j=1}^K \gamma_j + n_{d,-i}^{1,(\cdot)}} \times \frac{\beta_1 + n_{\cdot,-i}^{1,k,w_i}}{\Sigma_{j=1}^W \beta_j + n_{\cdot,-i}^{1,k,w_j}}$$

$$p(x_i = 2 \mid x_{-i}, z_{-i}, w, \alpha, \gamma, \beta_1, \beta_2, \beta_3) = \frac{\gamma_2 + n_{d,-i}^2}{\Sigma_{j=1}^3 \gamma_j + n_{d,-i}} \times \frac{\beta_{2,w_i} + n_{\cdot,-i}^{2,w_i}}{\Sigma_{j=1}^W \beta_{2,j} + n_{d,-i}^{2,w_i}}$$

$$p(x_i = 3 \mid x_{-i}, z_{-i}, w, \alpha, \gamma, \beta_1, \beta_2, \beta_3) = \frac{\gamma_3 + n_{d,-i}^3}{\Sigma_{j=1}^3 \gamma_j + n_{d,-i}} \times \frac{\beta_{3,w_i} + n_{\cdot,-i}^{3,w_i}}{\Sigma_{j=1}^W \beta_{3,j} + n_{\cdot,-i}^{3,w_j}}$$

where K is the number of topics, W is the size of vocabulary, e.g., visual vocabulary in the event d represents an image, −i in subscript means whole variables excluding the i-th variable; $n_{d,-i}^1$, $n_{d,-i}^2$, and $n_{d,-i}^3$ mean the numbers of words generated from topics, file-specific distribution (e.g., document, image, and/or multimedia file) and background distribution in file d; $n_{d,-i}^{1,k}$ means the number of words assigned to topic k in file d; $n_{\cdot,-i}^{1,k,w_i}$ means the number of times of word $w_i$ assigned to topic k in the whole corpus; $n_{d,-i}^{2,w_i}$ means the number of times of word $w_i$ assigned to file-specific distribution in file d; and $n_{\cdot,-i}^{3,w_i}$ means the number of times of word $w_i$ assigned to background distribution in the whole corpus.

Using the above variant, in the M step, expectation is maximized with respect to model parameters. The expectation may be approximated by $$\underset{\alpha,\gamma,\beta_{1,2,3}}{\mathrm{argmax}} \frac{1}{M} \Sigma_{j=1}^M \log(p(w, x_j, z_j \mid \alpha, \gamma, \beta_{1,2,3}))$$

where M is the number of samples drawn in the E step. Because all hidden variables are observed, the joint probability can be decomposed to a product of several simple probabilities, which are able to be separately estimated. A Newton-Raphson algorithm may be used to estimate Dirichlet hyper-parameters.

At 506 unseen files are inferred as presented in Table 4, below. This enables learning a model with a small proportion of files from a large corpus and applying the model to infer hidden variables of the remaining files to be indexed in the database as well as query files.

TABLE 4

Algorithm 2. Inference of Latent Variables

1. Uniformly dispatch documents to different processors
2. for a document on a processor
   a) "burn-in" the Markov chain. Sampling N (e.g. 50) rounds as equation (5)
   b) Repeat until converge
      i. Sampling L (e.g. 20) rounds to get a group of x and z as Equation (5)
   c) Compute expectations of $\lambda$, $\theta$ and $\psi$ The same algorithm may be used for inference as was used for estimation. However, at least part of the model parameters will be fixed to be those obtained in the estimation step. The two terms $$\frac{\beta_1 + n_{.,-i}^{1,k,w_i}}{\sum_{j=1}^{W} \beta_j + n_{.,-i}^{1,k,w_j}}, \text{ and } \frac{\beta_{3,w_i} + n_{.,-i}^{3,w_i}}{\sum_{j=1}^{W} \beta_{3,j} + n_{.,-i}^{3,w_j}}$$

are replaced by $\phi_{k,w_i}$ and $\omega_{w_i}$. It is remarkable that the inference of different files are independent of each other. Indeed, that the inference of latent variables of different files are independent from each other. Only statistics inside a file are involved in the computation of Gibbs sampling. Thus, parallel decomposition may be achieved by distributing files to different processors providing for excellent scalability.

Once latent variables of a file have been inferred, the remaining decomposition results are obtained. To determine file-specific words, conditional probability is computed using the following equation.

$$p(x_i = 2 | w_i, d) = \frac{p(w_i | x_i = 2, d) p(x_i = 2 | d)}{p(w_i | d)} \propto \frac{\varphi_{d,w_i}}{p(w_i | d)}$$

To reduce computations, the posterior is approximated by $\rho_{d,w_i}$ in practice. This probability is used to control the number of file-specific words to be between about 11 to 40, e.g., 15, 30, etc. Instead of explicitly determining topic-related words, a compact representation of the topic-related words is obtained from the model, i.e., the topic mixture proportion ($\theta_d$). Because corpus background words will be discarded, such words are also not explicitly determined. Thus, a file representation such as 312 is produced comprising $<\theta_d, \phi_d>$ where $\theta_d$ is used to define the query topic 314.

At 508 file similarity is measured. Given a query file, a heuristic method is used to compute similarity of the query file to each file in the database at 316. The similarity function used is a linear combination of two evidences.

$$\text{sim}(d,q) = \gamma_{d1}\gamma_{q1}\text{sim}(\theta_d,\theta_q) + \gamma_{d2}\gamma_{q2}\text{sim}(\phi_d,\phi_q)$$

where $\theta_d$, $\theta_q$ stand for the topic mixture proportion of the two files, $\phi_d$, $\phi_q$ stand for file-specific distributions (p(w|x=2, d)), and $\gamma_{0.1}$ and $\gamma_{0.2}$ stand for the word ratios of topic-related terms and file-specific terms. These variables may be obtained by the inference algorithm. In at least one implementation, $\text{sim}(\theta_d, \theta_q)$ and $\text{sim}(\phi_d, \phi_q)$ were computed by inner products. In at least one other implementation, $\text{sim}(\theta_d, \theta_q)$ and $\text{sim}(\phi_d, \phi_q)$ were computed using cosine similarity. An advantage of the above ranking function is that it does not introduce additional parameters.

Indexing

Figure 6:
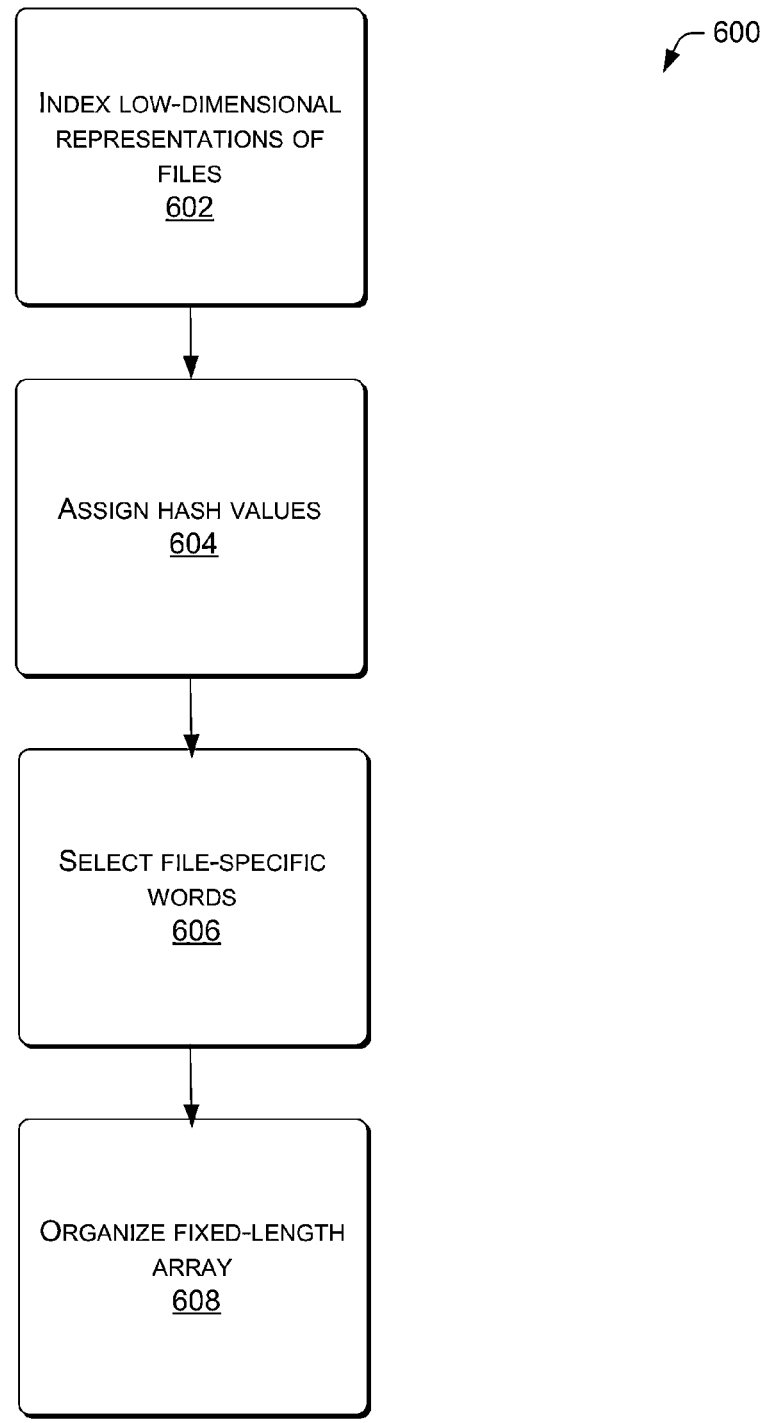
FIG. 6 is a flow diagram showing additional aspects of an illustrative process of implementing long-query retrieval.

FIG. 6 shows process 600 comprising an indexing scheme for database content 114. The result is used to measure similarity 508, as discussed above in multiple embodiments. An efficient indexing structure is designed based on the characteristics of the new representations of files at 312.

To index a virtually unlimited number of files to support long-query retrieval, the indexing solution operates with two requirements. First, the ranking function uses features of a single file and some global statistics, which allows indexing to be dispatched to several machines and retrieved in parallel. Second, the index on a single machine should be small enough to be loaded in memory and the computational cost of ranking functions should be low enough so that the single machine used in indexing responds to a query within a few milliseconds.

Action 314 comprises process 600 performed by indexing logic 108 to define a query topic using separate indexes for topic-related words and file-specific words. The two indexes are used to compute the similarities discussed above.

At 602, indexing logic 108 indexes topic-related words using locality sensitive hashing (LSH) in at least one embodiment. LSH is used because topic-related words of a file are represented by a compact and dense vector; this characteristic of the representation makes LSH appropriate for indexing the new representations. However, LSH is not appropriate for indexing high-dimensional sparse feature vectors, like TF-IDF features of files. At 604, a group of hash values is assigned to the file based on the LSH algorithm. These hash values may serve as a new discrete representation of a file for indexing. In some embodiments the discrete representations of files are indexed using inverted list for fast similarity computing. In such embodiments, the memory cost of the LSH index is only O(L×D), where L is the number of hash functions of LSH, between about 15 to 90, e.g., 30, 60, etc. and D is the number of files.

At 606, file-specific words are selected. As mentioned above, only a small number of words need be preserved as file-specific words. Because the most salient file-specific words are selected according to the conditional probability of file-specific distributions (p(w|x=2, d)), the number of file-specific words can be set to be small, between about 11 to 40, e.g., 15, 30, etc. The file-specific words of a file are organized as a fixed-length array in which each component is a <wordId, weight> pair where weight is $\phi_w$. This array may be considered a forward list or other type of file meta information. An advantage of the fixed-length array is that the meta information of any file represented in content database 114 can be efficiently randomly accessed.

Re-Ranking

Figure 7:
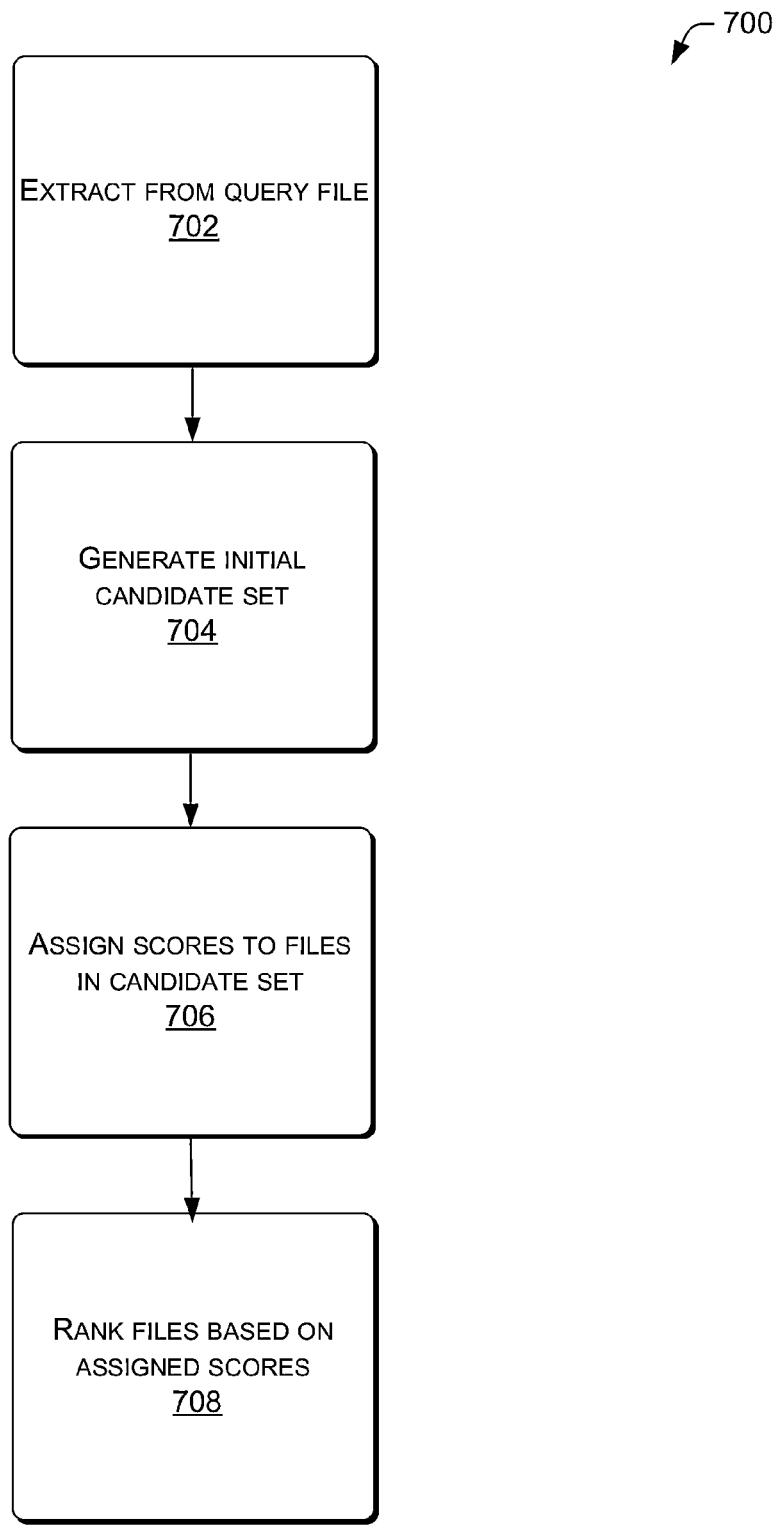
FIG. 7 is a flow diagram showing additional aspects of an illustrative process of implementing long-query retrieval.

FIG. 7 shows further details of how selection logic 112 performs action 316 of comparing query topics 314 and entries in content database 114 using topic model 306. Action 316 in the described embodiment comprises an automated analysis 700 which compares query topics 314 and entries in content database 114 to accomplish long-query retrieval. An efficient ranking scheme is developed based on considering the functionalities (in terms of representing semantics of a file) of the two components of the compound representation of a file $<\theta_d, \phi_d>$. The first similarity, $\text{sim}(\theta_d, \theta_q)$ distinguishes files belonging to different topic categories, (e.g., document subjects, visual categories, etc.) while the second similarity $\text{sim}(\phi_d, \phi_q)$ complements the first similarity by further distinguishing between files from a category belonging to different sub-categories. Thus, re-ranking, e.g., two-step re-ranking is processed.

Action 702 represents selection logic 112 extracting $\theta_q$ (topic mixture proportion) and $\phi_q$ (a file-specific word distribution) from the query file q.

Action 704 represents generating an initial candidate set of relevant files between about 40 to 300, e.g., 50, 200, etc. In at least one embodiment the initial candidate set of relevant files is generated by approximately computing cosine($\theta_d$, $\theta_q$) using LSH. In at least one other embodiment sim($\theta_d$, $\theta_q$) is used to select k files as a candidate set where $\theta_d$ is indexed by LSH.

Action 706 represents assigning scores to files in the candidate set using a similarity equation, such as sim(d,q)=$\gamma_{d1}\gamma_{q1}$sim($\theta_d,\theta_q$)+$\gamma_{d2}\gamma_{q2}$sim($\phi_d,\phi_q$). Thus the final scores include calculations based on minor semantics to distinguish based on sub-categories. By combining information from topic-related words and file-specific words to re-rank files in this set this approach obtains almost the same result as ranking using the similarity equation ran on the entire corpus.

Action 708 represents ranking the files in the candidate set according to the final scores. A configurable number of the top ranked files are then presented by search service 102 to viewer 104. By using the ranking algorithms based on the proposed index scheme, the results differ from ranking using the similarity equation run on the entire corpus because 1) LSH is an approximate nearest-neighbor algorithm, and 2) only a few of the most salient file-specific terms are kept in the index. However, the minor sacrifice of accuracy significantly reduces the response time to long-queries and saves memory cost.

Figure 8A:
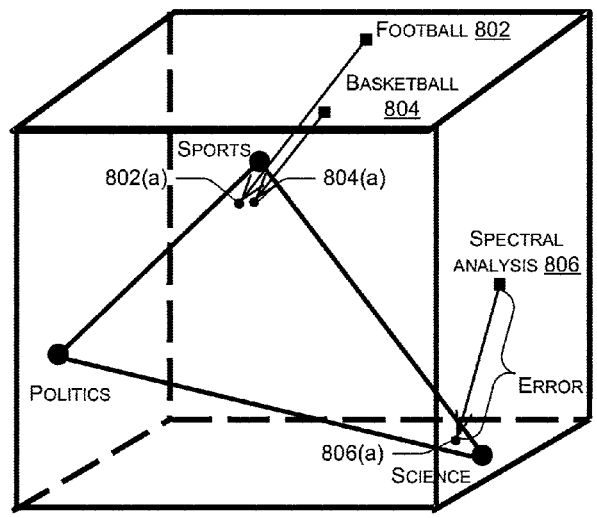
FIG. 8A is a graph illustrating a decomposition model applied to documents.
Figure 8B:
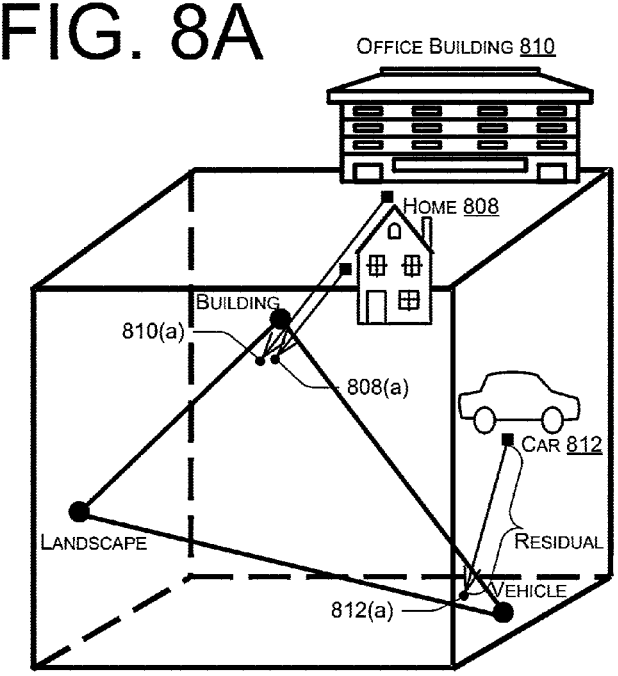
FIG. 8B is a graph illustrating a decomposition model applied to images.

FIGS. 8A and 8B illustrate decomposition. The cube denotes a vector space of files and, the triangle represents a latent space, also referred to as a simplex, spanned by three bases, i.e., topics. A rectangle point denotes a particular file and a circle point denotes an embedding of a file in the topic simplex. The distance of a file to the simplex is its residual.

In FIG. 8A, the relationship of a vector space and latent space obtained by pLSI is illustrated. A simplex spanned by three topics, politics, sports, and science is presented. The documents about football 802 and basketball 804 are projected to almost the same position in the simplex, 802(*a*) and 804(*a*), respectively, while the document about spectral analysis 806 is projected to a position far from them at 806(*a*). Thus, documents about sports and science may be easily distinguished by their coordinates in topic space— their dimension reduction results. However, the dimension reduction results of the two documents about sports may not be enough to distinguish between them. Nevertheless, the distance to the topic simplex for each is different. This represents their residuals, ($\epsilon_i$) also referred to as a reconstruction error that cannot be projected to the latent space. Thus, the two files about sports are distinguishable by their residuals, i.e., their distances to the topic simplex.

In a document, most of the words (e.g., "play" and "score") contribute to define the major semantics, which are recoverable by the document's topic distribution, while a few special—document-specific words (e.g., "basketball" and "football") appearing in a few documents cause the reconstruction error.

Similarly, in FIG. 8B, the cube denotes a vector space of images represented by bag of words, and the triangle denotes a simplex spanned by three topics, landscape, building, and vehicle. The two images of a home 808 and an office building 810 are projected to almost the same position in the simplex, 808(*a*) and 810(*a*), respectively, while the image of a car 812 is projected to a position far from them at 812(*a*). Thus distinguishing between images of a home and a car or a car and an office building is clear in the low dimensional subspace. However, the dimension reduction results of the two images of buildings may not be enough to distinguish between them. Nevertheless, the distance to the topic simplex for each is different. This represents their residuals ($\epsilon_i$) that cannot be projected to the latent space.

In at least one implementation, the images represent photographs. For example, the cube may denote a vector space of photographs represented by bag of words, and the triangle may denote a simplex spanned by three topics, outdoor, indoor, and star. Thus two images of a kitchen and an office will be projected to almost the same position in the simplex close to the indoor vertex, while the image of alpha centauri is projected to a position far from them.

The image of alpha centauri may be projected to a position in the simplex close to the star vertex. However, addressing the synonymy and polysemy of the topic "star," the image of alpha centauri may be projected closer to the outdoor vertex in the event the topic star is directed to people, like Oprah Winfrey or Daniel Craig. Nevertheless, distinguishing between images of a kitchen and alpha centauri or alpha centauri and an office, or alpha centauri and human stars is clear in the low dimensional subspace. Even though the dimension reduction results of the two indoor images may not be enough to distinguish between the two of them, the distance to the topic simplex for each will be different. Thus they may be distinguished by their residuals that are not projected to the latent space.

Figure 9:
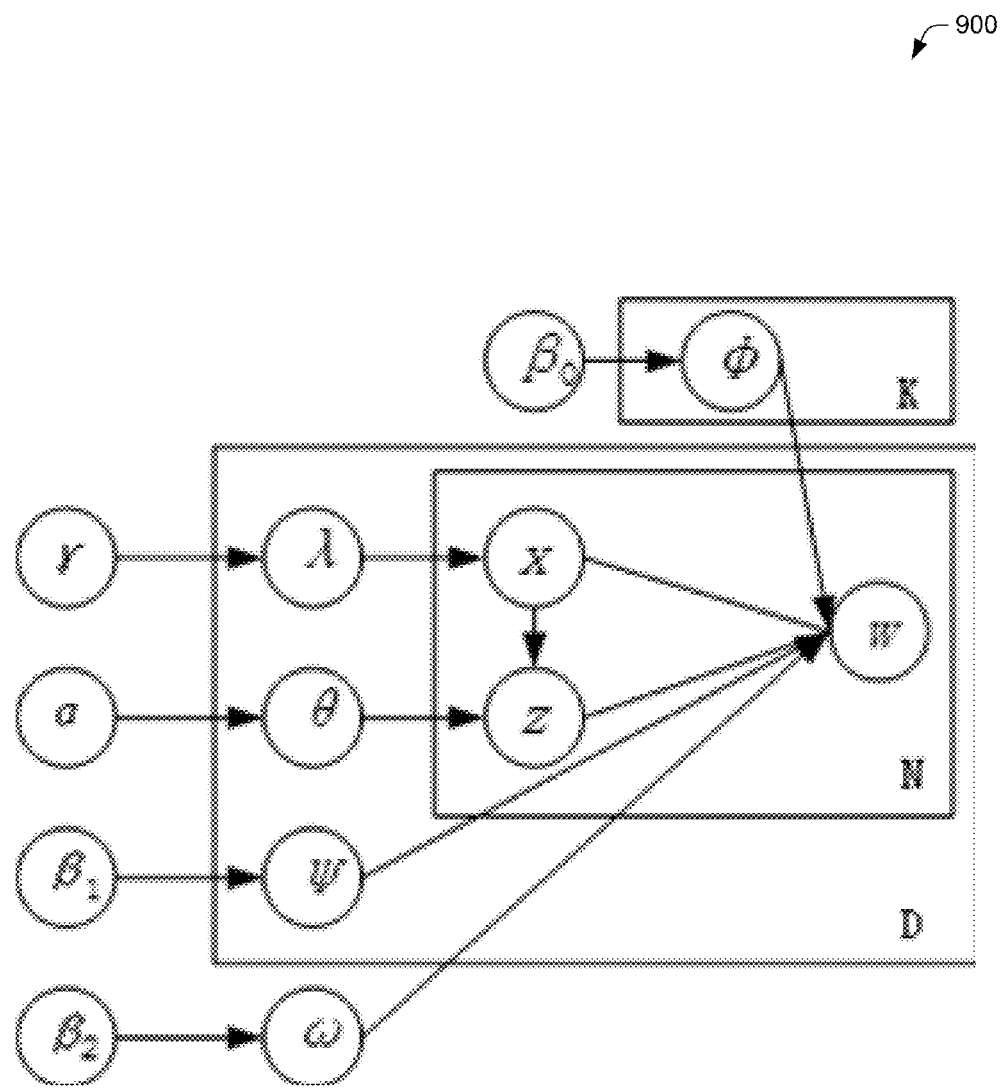
FIG. 9 illustrates an example of a probabilistic decomposition model (DM) as performed in at least one embodiment of long-query retrieval.

FIG. 9 illustrates an example of the probabilistic decomposition model (DM) at 900 as discussed regarding table 1 and table 2 above and performed in at least one embodiment.

Figure 10A:
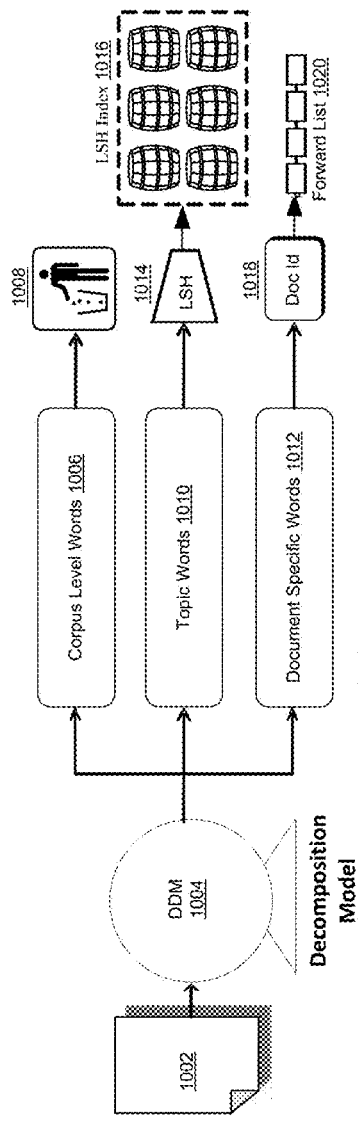
FIG. 10A shows an illustrative workflow of an indexing framework for long-query retrieval applied to a document.
Figure 10B:
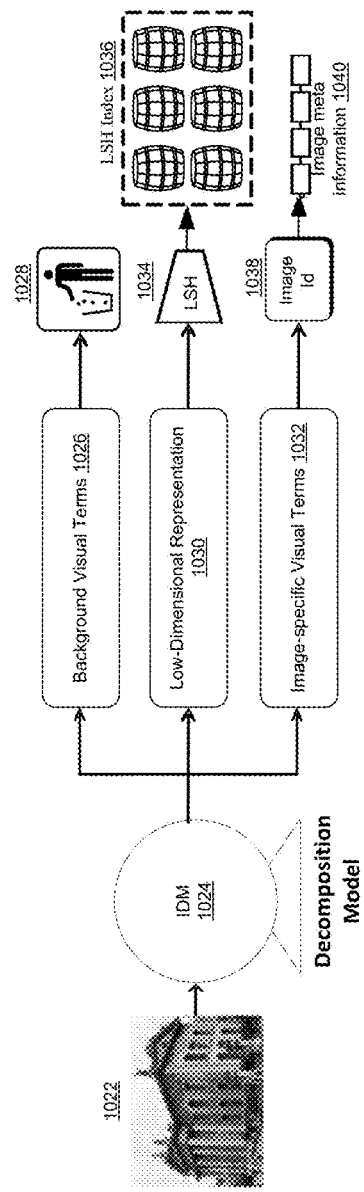
FIG. 10B shows an illustrative workflow of an indexing framework for long-query retrieval applied to an image.

FIGS. 10A and 10B illustrate overall workflow of the indexing framework discussed above. The decomposition model decomposes a file to three components. The three components are addressed appropriately. As shown in FIG. 10A, when a document query 1002 undergoes decomposition in the document decomposition model 1004, the first component, corpus level words 1006 are discarded 1008, while the second component, topic words 1010 and third component document specific words 1012 are indexed. The topic words and document specific words are indexed separately. As discussed above, the topic words undergo dimension reduction using LSH 1014, to obtain an LSH Index 1016, while the document specific words are associated with a Document Id 1018 and indexed as a forward list 1020.

Similarly, as shown in FIG. 10B, when an image query 1022 undergoes decomposition in the image decomposition model 1024, the first component, background visual terms 1026 are discarded 1028. Background visual terms are common for all images in a database; thus they cannot discriminate images with different semantics. The second component, a low-dimensional representation of the image 1030 and third component image-specific visual terms 1032 are indexed. The low-dimensional representation and document image-specific visual terms are indexed separately. Furthermore, as discussed above, the low-dimensional representation undergoes dimension reduction using LSH 1034, to obtain an LSH Index 1036, while the image-specific visual terms are associated with a Image Id 1038 and indexed as image meta information 1040.

Exemplary Operating Environment

The environment described below constitutes but one example and is not intended to limit application of the system described above to any one particular operating environment. Other environments may be used without departing from the spirit and scope of the claimed subject matter.

Figure 11:
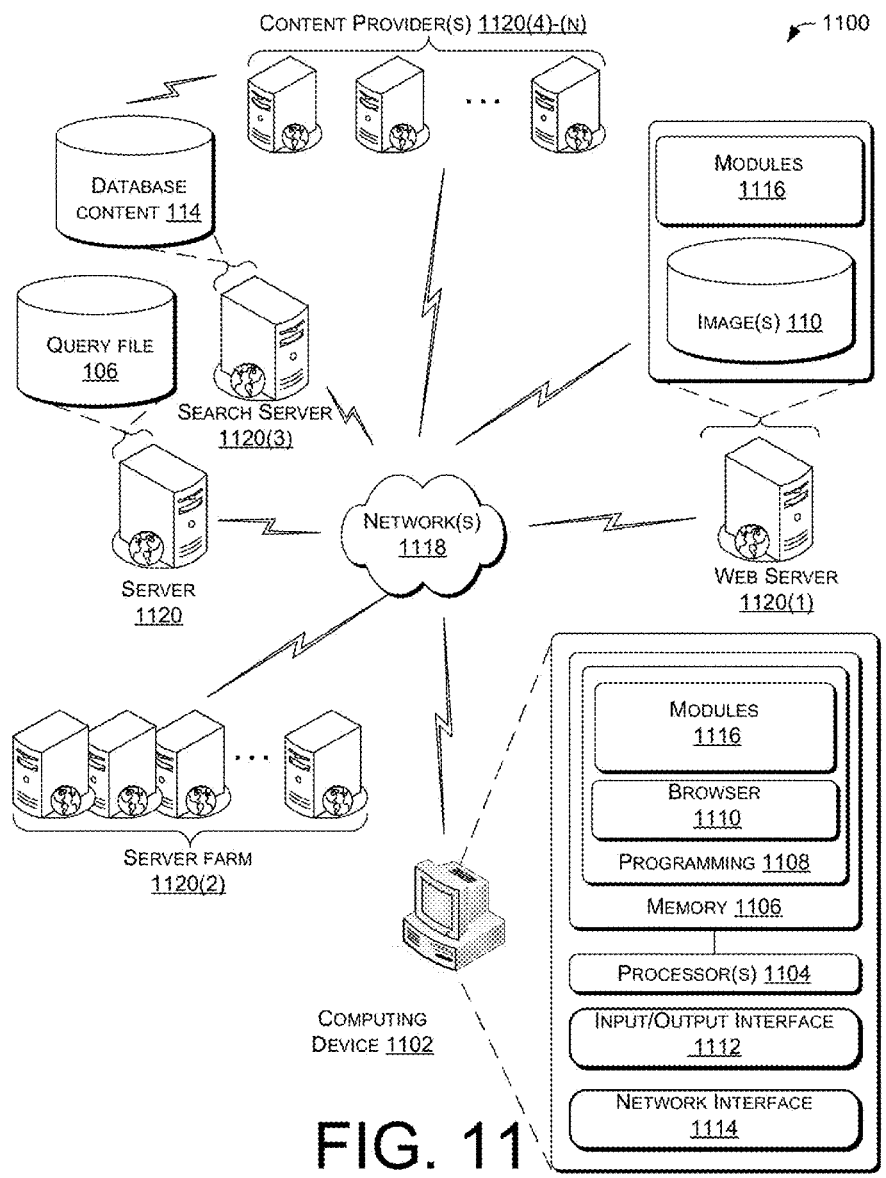
FIG. 11 illustrates an illustrative operating environment.

FIG. 11 illustrates one such operating environment generally at 1100 comprising at least a first computing device 1102 having one or more processor(s) 1104 and computer-readable media such as memory 1106. Computing device 1102 may be one of a variety of computing devices, such as a set-top box, cellular telephone, smart phone, personal digital assistant, netbook computer, laptop computer, desktop computer, or server. Each computing device having at least one processor capable of accessing and/or executing programming 1108 embodied on the computer-readable media. In at least one embodiment, the computer-readable media comprises or has access to a browser 1110, which is a module, program, or other entity capable of interacting with a network-enabled entity.

Device 1102 in this example includes at least one input/output interface 1112, and network interface 1114. Depending on the configuration and type of device 1102, the memory 1106 can be implemented as or may include volatile memory (such as RAM), nonvolatile memory, removable memory, and/or non-removable memory, implemented in any method or technology for storage of information, such as computer-readable instructions, data structures, program modules, or other data shown generally at 1116. Also, the processor(s) 1104 may include onboard memory in addition to or instead of the memory 1106. Some examples of storage media that may be included in memory 1006 and/or processor(s) 1104 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the processor(s) 1104. The computing device 1102 may also include input/output devices including a keyboard, mouse, microphone, printer, monitor, and speakers (not shown).

Device 1102 represents computing hardware that can be used to implement functional aspects of the system shown in FIG. 1 at a single location or distributed over multiple locations. Network interface 1114 can connect device 1102 to a network 1118. The network 1118 may enable communication between a plurality of device(s) 1102 and can comprise a global or local wired or wireless network, such as the Internet, a local area network (LAN), or an intranet.

Device 1102 may serve in some instances as server 1120. In instances where device 1102 operates as a server, components of device 1102 may be implemented in whole or in part as a web server, in a server farm, as a search server, and as one or more provider(s) of content. Although discussed separately below, it is to be understood that device 1102 may represent such servers and providers of content.

Device 1102 also stores or has access to query file(s) 106. As discussed above, query file(s) 106 includes documents, images collected by a user of device 1102, including photographs taken by consumers using digital cameras and/or video cameras and/or camera enabled cellular telephones, or images obtained from other media. Although shown located at server 1120 in FIG. 11, such content may alternatively (or additionally) be located at device 1102, sent over a network via streaming media or as part of a service such as search service 102, or stored as part of a webpage such as by a web server. Furthermore, in various embodiments query file(s) 106 may be located at least in part on external storage devices such as local network devices, thumb-drives, flash-drives, CDs, DVRs, external hard drives, etc. as well as network accessible locations.

In the context of the present subject matter, programming 1108 includes modules 1116, supplying the functionality for implementing long-query retrieval for searches based on files and other aspects of the environment of FIG. 1. In general, the modules 1116 can be implemented as computer-readable instructions, various data structures, and so forth via at least one processor 1104 to configure a device 1102 to execute instructions to implement search service 102 including indexing logic 108 and/or selection logic 112 based on query file(s) 106. The computer-readable instructions may also configure device 1102 to perform operations implementing indexing logic 108 comparing query file(s) 106 with document-like representations of images 110 to derive a topic of interest, and matching the derived topic of interest with topics of database content 114 to return search results based on an image query. Functionality to perform these operations may be included in multiple devices or a single device as represented by device 1102.

Various logical components that enable long-query retrieval from one or more long-queries including query file(s) 106 may also connect to network 1118. Furthermore, query file(s) 106 may be stored locally on a computing device such as 1102 or in one or more network accessible locations, streamed, or served from a server 1120.

In aspects of several embodiments server(s) 1120 may be implemented as web server 1120(1), in a server farm 1120 (2), as a search server 1120(3), and as content provider(s) 1120(N)-(Z). In various embodiments, search results may be served by or requested from database content 114 housed on a search server 1120(3) or directly from content provider(s) 1120(4)-(N).

In the illustrated embodiment a web server 1120(1) also hosts images and/or document-like representations of images 110, alternately called an image corpus, which search service 102 searches for graphically similar images. As illustrated, modules 1116 may be located at a server, such as web server 1120 and/or may be included in modules 1116 on any other computing device 1102. Similarly, query file(s) 106 may be located at computing device 1102, sent over a network such as network(s) 1118 via streaming media, stored at a server 1120, or as part of a webpage such as at web server 1120(1) or server farm 1120(2).

Aspects of computing devices, such as computing devices 1102 and 1120, in at least one embodiment include functionality for long-query retrieval based on query file(s) 106 using indexing logic 108. For example, as shown from computing device 1102 and server 1120, program modules can be implemented as computer-readable instructions, various data structures, and so forth via at least one processing unit to configure a computer having memory to determine long-query results via operations of indexing logic 108 comparing query file(s) 106 comprising an image query with images and/or document-like representations of images 110 to derive a topic of interest, and selection logic 112 matching the derived topic of interest with topics of other files such as from database content 114 to return relevant search based on query file 106.

CONCLUSION

Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claims. For example, in at least one embodiment, process 200 as discussed regarding FIG. 2, is performed independently of processes 300, 400, 500, 600, and 700, as discussed regarding FIGS. 3, 4, 5, 6, and 7. However, in other embodiments, performance of one or more of the processes 200, 300, 400, 500, 600, and 700 may be incorporated in, or performed in conjunction with each other. For example, process 700 may be performed in lieu of block 206 of FIG. 2.

We claim:

1. A computer comprising:
 a processor coupled to a computer memory, the computer memory having computer executable instructions encoded thereon, the computer executable instructions when executed by the processor configure the computer to perform operations comprising:
 identifying an image file on which to base a query;
 performing decomposition comprising utilizing a probabilistic topic model extrinsic to the image file to obtain a decomposed version of the image file, the decomposed version of the image file comprising:
  low-dimensional representations; and
  image-specific terms;
 creating a composite representation of the image file, the composite representation comprising:
  a vector of the low-dimensional representations; and
  an index of image-specific terms;
 based at least on the vector of low-dimensional representations, determining a topic corresponding to the image file;
 comparing the vector of the low-dimensional representations corresponding to the image file to vectors of low-dimensional representations corresponding to a plurality of files; and
 selecting a candidate set of files from the plurality of files based at least on a ranking of closeness of proximity of the vectors of the low-dimensional representations corresponding to the candidate set of files to the vector of the low-dimensional representations corresponding to the image file.

2. A computer as recited in claim 1, wherein the performing decomposition further comprises estimating parameters for the probabilistic topic model.

3. A computer as recited in claim 1, wherein the performing decomposition further comprises inferring unseen files independent of known files.

4. A computer as recited in claim 1, wherein the image file comprises at least one of:
 a photograph; or
 a multimedia file.

5. A computer as recited in claim 1, wherein the computer executable instructions when executed by the processor configure the computer to perform operations further comprising:
 comparing the index of the image-specific terms corresponding to the image file to indexes of the image-specific terms corresponding to the files in the candidate set of files;
 assigning scores to files in the candidate set of files based at least on calculated similarity of the indexes of the candidate set of files and the index of the image file; and
 returning a number of the files from the candidate set of files having the highest scores.

6. A method comprising:
 identifying an image file for a long-query;
 decomposing the image file utilizing a probabilistic topic model;
 representing a decomposed file with a vector and an index of image-specific keywords;
 selecting a candidate set of files for a long-query result based at least on the vector;
 ranking the files in the candidate set of files for the long-query result based on the index of the image-specific keywords; and
 returning files in the candidate set of files for the long-query result based at least on the ranking.

7. A method as recited in claim 6, further comprising determining a long-query topic corresponding to at least one of the vector or the image-specific keywords.

8. A method as recited in claim 6, further comprising determining a file topic corresponding to each of the candidate set of files.

9. A method as recited in claim 6, further comprising:
 determining a long-query topic corresponding to at least one of the vector or the image-specific keywords;
 determining a file topic corresponding to each of the candidate set of files; and
 searching among the file topics corresponding to each of the candidate set of files to find one or more file topics similar to the long-query topic; and
 selecting those files from the candidate set of files having file topics corresponding to the long-query topic.

10. A method as recited in claim 6, wherein the file for the long-query comprises low-dimensional representations.

11. A method as recited in claim 10, wherein the low-dimensional representations comprise topic related words and the image-specific terms comprise file-specific words.

12. A method as recited in claim 6, wherein the vector comprises low-dimensional representations.

13. A method as recited in claim 6, wherein the image file for the long-query makes up part of a document.

14. A method as recited in claim 6, wherein the candidate set of files comprise a compound file representation of files having undergone dimension reduction.

15. A method as recited in claim 6, wherein the candidate set of files are indexed using a fixed-length array.

16. A method comprising:
 providing an image file as a long-query to a decomposition model, wherein the decomposition model:
  partitions the file into at least three parts;
  identifies a first part as image-specific terms;
  represents a second part as low-dimensional representations; and
  discards a third part as background terms;
 storing a representation of the image file indexed by a representation of low-dimensional representations and the image-specific terms; and
 using the representation of the image file to search a probabilistic topic model to define a query topic.

17. A method as recited in claim 16, further comprising performing matching between a file vector comprising the low-dimensional representations corresponding to the image file provided as the long-query and file vectors comprising low-dimensional representations corresponding to stored representations of other files.

18. A method as recited in claim 16, further comprising performing ranking of the representation of the image file based at least on the image-specific terms.

19. A computer comprising:
a processor coupled to a computer memory having computer-executable instructions encoded thereon to program the computer to implement the method of claim 16 upon execution by the processor.

20. A method as recited in claim 16, further comprising:
defining vector-residual pair representations of topics in the probabilistic topic model;
defining a vector-residual pair representation of the image file; and
comparing the vector-residual pair representation of the image file with the vector-residual pair representations of topics in the probabilistic topic model to assess similarities.

* * * * *